Feb. 2, 1965 R. L. WALSH 3,168,411
METHOD OF COATING BASE AND TOP COATS
Filed March 29, 1961 2 Sheets-Sheet 1
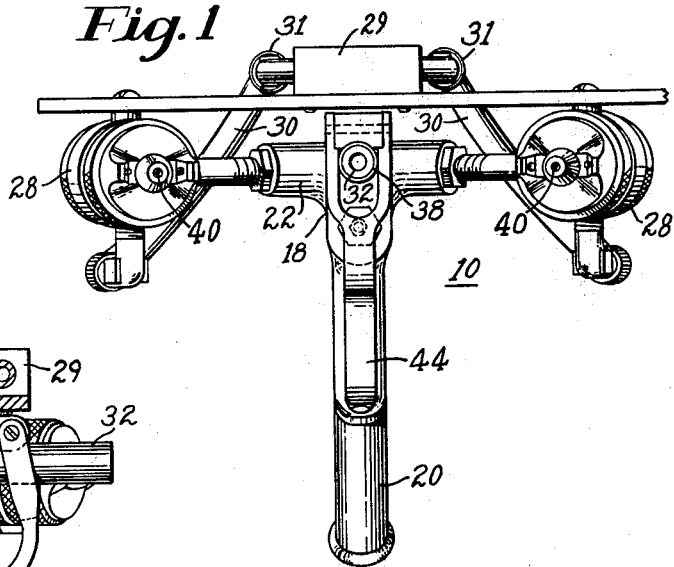
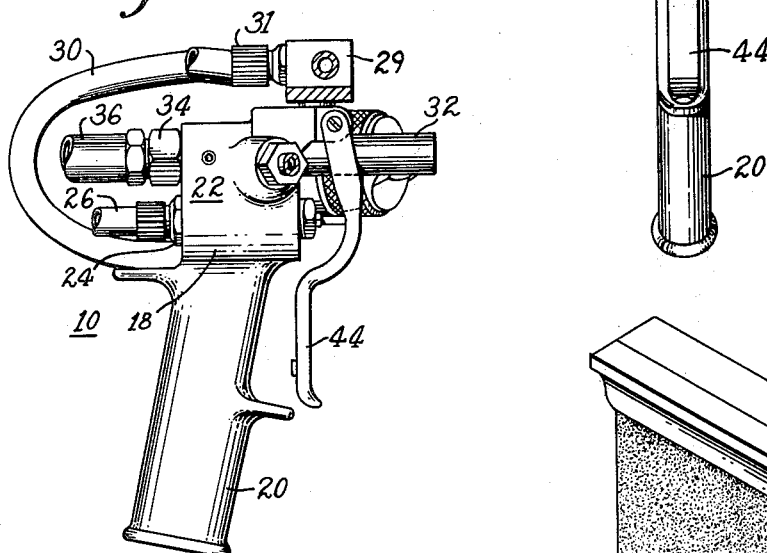
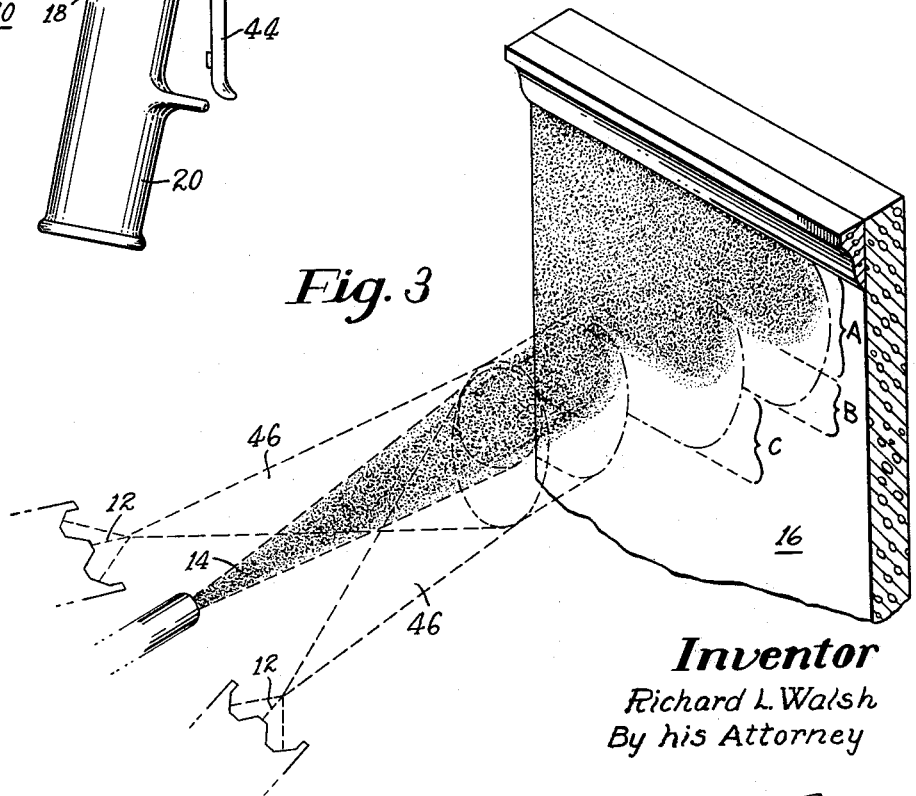
Inventor
Richard L. Walsh
By his Attorney United States Patent Office 3,168,411
Patented Feb. 2, 1965

3,168,411
METHOD OF COATING BASE AND TOP COATS
Richard L. Walsh, Newburyport, Mass., assignor, by mesne assignments, to United Shoe Machinery Corporation, Boston, Mass., a corporation of New Jersey
Filed Mar. 29, 1961, Ser. No. 99,142
3 Claims. (Cl. 117—26)

This invention relates generally to a method for coating surfaces and has particular reference to a method of applying a coating to a surface such as the side wall of a building. A spray apparatus for practicing the method of the invention is the subject matter of a co-pending application, Serial No. 299,880, filed August 5, 1963.

With the development of new types of resins, such as polyurethanes and epoxys, having adhesion and weathering qualities superior to previously known coating resins, it has become feasible to utilize organic coating materials to apply weather resistant coatings to buildings having masonry exterior surfaces such as brick, cement, stucco and stone. To reduce the cost of the coating, and to provide various surface textures and colors, it is usually desirable to mix with the resin a particulate material such as sand, quartz, mica, glass beads, roofing granules or the like.

For speed of application, it is desirable to apply the coating by means of spray apparatus in which the resin and the particulate material are directed toward the surface simultaneously, with the resin and particulate material mixing in mid air, so that the individual particles receive a coating of resin before they impinge onto the wall. However, this method of applying the coating has been found to have certain difficulties that make it impractical for use in many applications. The weight and volume of the particulate material requires that it be stored on the ground and lifted to the spray gun in an air stream and projected by said air stream out of the gun toward the wall surface. The velocity so imparted to the particulate material causes a substantial proportion thereof to rebound off the wall without adhering. The material so wasted not only increases the raw material cost but also increases the hazards of the operation, since the wasted particles, in falling to the ground, may be blown about by the wind and damage adjacent buildings, automobiles and the like.

One method of substantially reducing the amount of particulate material that is so wasted is to apply a prime coat of resin to the surface just prior to applying the resin sand mixture, so that the coated sand particles never impinge onto the bare wall, but always onto a resin-coated surface. However, this procedure greatly increases the labor cost of the application.

The object of this invention is to provide a method of coating a surface with a mixture of resin and particulate material in a single operation without substantial waste of the particulate material.

Other objects of the invention will be apparent to one skilled in the art from the following description of a specific embodiment thereof.

In the drawing,

FIG. 1 is a view in front elevation of a spray gun embodying the features of the invention;

FIG. 2 is a view of the spray gun of FIG. 1 as seen from the left side, partly broken away;

FIG. 3 is a perspective view of a spray pattern provided by the gun of FIG. 1;

Figure 4:
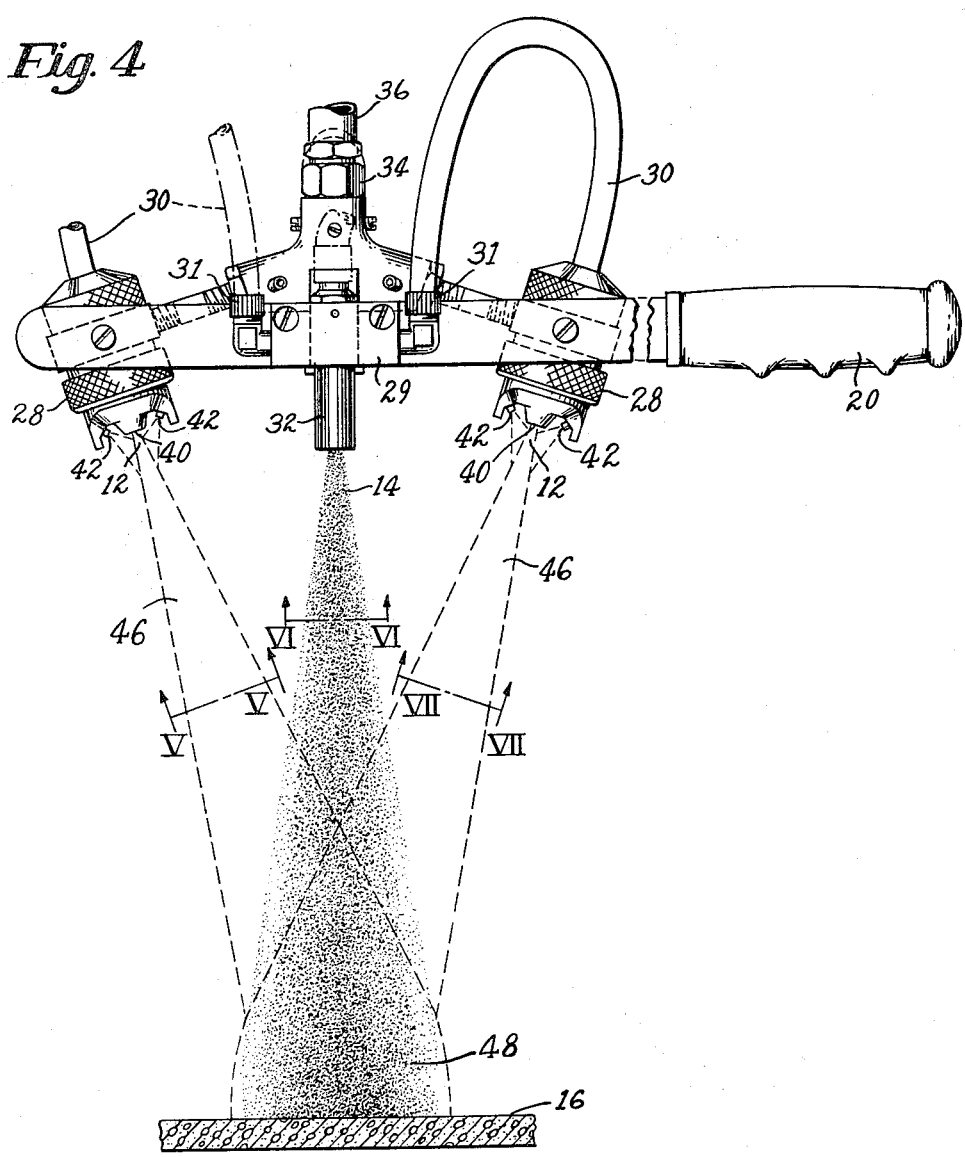
FIG. 4 is a top plan view of the gun of FIG. 1 and the spray pattern produced thereby.

Referring to FIGS. 1, 2 and 4 of the drawing, there is illustrated a spray gun 10 which is particularly adapted for use in applying a coating comprising a resin component 12 and a particulate material component 14 to a surface such as a wall 16 of a building or the like. The particulate material may be of the type hereinbefore mentioned, and the resin component may comprise an organic coating polymer of any suitable type which may be dissolved or dispersed in a volatile solvent, and may or may not include coloring pigments.

The gun 10 comprises generally a frame 18 having a downwardly extending hand grip 20 with an air manifold 22 on the upper end thereof having an air connection 24 on the rear end to receive an air supply hose 26.

A resin spray nozzle 28 is disposed on each side of the air manifold and the nozzles are connected to a resin manifold 29 by conduits 30. The resin manifold 29 may be supplied with resin under pressure through a rear connection 31. A sand supply nozzle 32 is disposed on the frame, and in the illustrated embodiment extends through the air manifold 22 and is supported thereby. The rear end of the sand supply nozzle is provided with a connection 34 receiving a sand supply tube 36. The front end of the sand supply nozzle extends forwardly from the manifold and may be provided with a liner 38 of rubber or the like to resist the abrasive action of the sand particles.

The supply of sand, or other particulate material, may be lifted to the gun through the supply tube 36 in an air stream in the usual manner and passes directly through the nozzle 32 to be projected forwardly from the gun with a velocity which will depend on the pressure of the air supplied to the tube 36 and the vertical distance the sand must travel to reach the gun. In the illustrated embodiment the sand discharge nozzle aperture is substantially circular in cross-section to impart a substantially circular pattern to the sand projected therefrom for a purpose to appear hereinafter.

The resin spray nozzles 28 each comprise a central resin discharge aperture 40 and a pair of air discharge apertures 42 disposed horizontally on opposite sides of the aperture 40, and directed inwardly toward the axis of the resin aperture. The nozzles 28 are directed forwardly and inwardly toward the axis of the sand supply nozzle so that material projected from the two nozzles 28 converges a predetermined distance in front of the gun in a manner to appear hereinafter. The operation of the spray nozzles 28 is controlled by a hand trigger 44, which operates an air valve (not shown) disposed in the frame of the gun. By depressing the hand trigger 44, air pressure is admitted from the manifold to the spray nozzles and is discharged through the apertures 42. The air pressure so applied to the nozzles 28 also opens an internal resin valve (not shown) permitting resin to be discharged from the apertures 40. Nozzles of this type, in which the resin flow is initiated by the air pressure applied thereto, are well known in the art, and do not form part of the present invention.

The sand flow may be controlled by valve means (not shown) at the air supply for the sand conduit, and since the sand velocity is kept as low as possible to help reduce the amount of sand rebound, the sand flow may be temporarily stopped by the operator of the gun by merely placing a finger over the sand discharge aperture.

Figure 5:
FIG. 5 is a view in section taken on line V—V of FIG. 4.
Figure 6:
FIG. 6 is a view in section taken on line VI—VI of FIG. 4.
Figure 7:
FIG. 7 is a view in section taken on line VII—VII of FIG. 4.

The resin streams issuing from the apertures 40 are originally circular in cross section. Air impinging thereon from the horizontally spaced air nozzles 42 shape the streams into an air-resin spray 46 which is generally oval in cross section with the long axis thereof extending generally vertically. (See FIGS. 5 and 7.) As illustrated in FIG. 4 the two air-resin streams converge in front of the gun on the axis of the sand discharge nozzle, where they impinge on and coat the sand particles issuing from the sand nozzle. The converging of the two air-resin sprays tends to neutralize their lateral motion, so that they continue toward the wall as a single vertically elongated stream 48 of a sand-resin mixture having a generally oval cross section.

The sand particles issue from the nozzle 32 in a substantially circular pattern, with the particles being directed into the oval resin pattern so that substantially all of the sand particles are disposed within the resin pattern.

In the illustrated embodiment, the sand particles are directed into the upper portion of the resin pattern, so that a lower portion of the resin pattern is substantially free of sand particles for a purpose to appear hereinafter (see FIG. 3). The sand pattern also has a horizontal width less than that of the resin pattern so that a portion of the resin pattern on each side of the sand pattern is substantially free of sand particles.

Referring to FIG. 3 there is illustrated a method of applying a coating to a surface such as a building side wall by means of the above described spray gun. In applying the coating it is desirable to start at the top of the wall and work down. With any cornice or other portion of the structure which is not to be coated suitably masked, a first horizontal pass of the spray gun may be made at the top edge of the portion to be coated, with the sand nozzle being closed off in the manner previously described, so that a resin coating is applied to the areas indicated by horizontal strips A and B. The sand nozzle may then be opened and a second pass made over the same area, so that a sand resin mixture is applied to area A, with substantially only resin being applied to area B. In a third pass, the spray from the gun is directed so that the upper portion of the spray pattern falls on area B, previously coated with resin, and the lower portion of the pattern, containing substantially no sand falls on horizontal strip C. Hence, as the work area moves downwardly, on each pass of the gun, a lower horizontal strip is coated with a layer of resin substantially free of sand particles and an upper horizontal strip, coated with resin on the previous pass of the gun is coated with a sand resin mixture. Thus, the sand-resin mixture always impinges on a surface previously coated with resin, thereby greatly reducing the rebound of the particles from the wall.

Since the sand particles are normally more concentrated in the center of the pattern than at the outer edge, it is desirable, as illustrated in FIG. 3, to so direct the gun that in each pass, the same pattern slightly overlaps the sand pattern applied on the previous pass.

The provision of a resin pattern greater in width than the sand pattern insures that no particles will strike the wall without being coated, and, as the gun moves horizontally, the leading edge of the pattern provides an additional amount of resin prime coating ahead of the sand-resin pattern, and the trailing edge provides an additional resin coat on top of the particles adhered to the wall.

An additional amount of top coat may be applied as the work proceeds by simply shutting off the sand nozzle momentarily and recoating with resin only the area to which the sand-resin mixture has been applied.

Having thus described my invention, what I claim as new and desire to secure by Letters Patent of the United States is:

1. The method of coating a surface with a base coat and a top coat of a different composition in a single operation, comprising successively coating elongated co-lateral areas of a surface by means of successive parallel passes of a spray pattern which is elongated in a direction perpendicular to the direction of said passes, with top coat material predominating in one end portion of said elongated spray pattern and base coat material predominating in the other end of said elongated spray pattern, said successive passes overlapping so that on each pass said one end of the spray pattern recoats with top coat material the area coated on the previous pass with base coat material and said other end of the elongated spray pattern coats a theretofore uncoated portion of said surface with base coat material.

2. The method of coating a surface with a base coat of resin and a top coat of a mixture of resin and particulate material, comprising successively coating elongated co-lateral areas of a surface by means of successive passes of a spray pattern which is elongated in a direction perpendicular to the direction of said papes, with said particulate material being concentrated in an upper portion of the spray pattern and the lowermost portion thereof comprising resin substantially free of particulate material, said successive passes overlapping so that on each pass the portion of the spray pattern containing the particulate material recoats with a mixture of resin and particulate material the area coated on the previous pass with resin substantially free of particulate material and the lowermost portion of the spray pattern coats a theretofore uncoated area with resin substantially free of particulate material.

3. The method set out in claim 2 in which the resin spray pattern is generally oval shaped and the particulate material pattern is smaller than said resin spray pattern and wholly enclosed therein.

References Cited in the file of this patent
UNITED STATES PATENTS

| | | |
|---|---|---|
| 1,881,345 | Beatty et al. | Oct. 4, 1932 |
| 1,988,450 | Kelley | Jan. 22, 1945 |
| 2,370,408 | MacDonald | Feb. 27, 1945 |
| 2,413,901 | Abernathy | Jan. 7, 1947 |
| 2,433,363 | Lampe | Dec. 30, 1947 |
| 2,458,220 | Streigel et al. | Jan. 4, 1949 |
| 2,570,245 | Junge | Oct. 9, 1951 |
| 2,779,689 | Reis | Jan. 29, 1957 |
| 2,786,716 | Peers | Mar. 26, 1957 |
| 2,933,125 | Anderson | Apr. 19, 1960 |
| 3,000,576 | Levey et al. | Sept. 19, 1961 |
| 3,025,195 | Kozma | Mar. 13, 1962 |
| 3,033,472 | Sheldon | May 8, 1962 |